United States Patent
Zittel

(10) Patent No.: US 8,276,741 B1
(45) Date of Patent: Oct. 2, 2012

(54) BOTTLE CAP ORIENTING APPARATUS

(76) Inventor: Steven A. Zittel, Palmetto, FL (US)

( * ) Notice: Subject to any disclaimer, the term of this patent is extended or adjusted under 35 U.S.C. 154(b) by 239 days.

(21) Appl. No.: 12/899,182

(22) Filed: Oct. 6, 2010

(51) Int. Cl.
*B65G 47/24* (2006.01)
*B65G 15/58* (2006.01)

(52) U.S. Cl. ...... 198/382; 198/380; 198/400; 198/626.1

(58) Field of Classification Search .............. 198/380, 198/382, 377.04, 377.08, 689.1, 400, 626.1
See application file for complete search history.

(56) References Cited

U.S. PATENT DOCUMENTS

| | | | |
|---|---|---|---|
| 3,153,471 A * | 10/1964 | Arnett | 198/383 |
| 3,297,130 A * | 1/1967 | Greck | 198/383 |
| 3,526,311 A * | 9/1970 | Robinson | 198/400 |
| 3,526,905 A * | 9/1970 | Robinson | 198/400 |
| 3,874,740 A * | 4/1975 | Hurd | 406/87 |
| 4,081,069 A | 3/1978 | Ono | |
| 4,214,656 A * | 7/1980 | McDonald et al. | 198/380 |
| 4,362,234 A * | 12/1982 | McDonald et al. | 198/400 |
| 4,373,437 A | 2/1983 | Rodenbaugh et al. | |
| 4,610,345 A | 9/1986 | Spreen et al. | |
| 4,735,343 A | 4/1988 | Herzog | |
| 4,779,714 A | 10/1988 | Madden | |
| 4,863,007 A | 9/1989 | Eitzinger et al. | |
| 5,007,228 A | 4/1991 | Herzog | |
| 5,031,748 A | 7/1991 | Bianchini et al. | |
| 5,050,722 A | 9/1991 | Beswick | |
| 5,333,719 A | 8/1994 | Piazza | |
| 5,396,979 A | 3/1995 | Wysocki | |
| 5,404,991 A * | 4/1995 | Nakamura | 198/400 |
| 5,586,637 A | 12/1996 | Aidlin et al. | |
| 5,680,922 A | 10/1997 | Bessels | |
| 5,927,468 A * | 7/1999 | Corniani et al. | 198/394 |
| 5,954,184 A | 9/1999 | Schmitt | |
| 6,491,152 B1 | 12/2002 | Evers, Jr. et al. | |
| 7,228,953 B2 | 6/2007 | Perreault et al. | |
| 7,322,458 B1 | 1/2008 | McDonald et al. | |
| 7,377,507 B2 | 5/2008 | Yamamiya | |
| 2003/0006122 A1 | 1/2003 | Street et al. | |
| 2009/0071799 A1 | 3/2009 | Nalbach | |
| 2009/0166153 A1 | 7/2009 | Dotson et al. | |

* cited by examiner

*Primary Examiner* — Gene Crawford
*Assistant Examiner* — Keith R Campbell
(74) *Attorney, Agent, or Firm* — Charles J. Prescott

(57) ABSTRACT

A bottle cap orienting apparatus including a cap transfer assembly having a pair of opposing transfer belts each having curved first and second ends and upright facing straight sides opposingly spaced apart to define a gap sized to be equal to or greater than a height of the caps being transferred and reoriented for subsequent feeding into a bottle capping apparatus. A cap feed chute is positioned centrally between the first ends for conveying unoriented bottle caps in edge upright orientation into the gap. Each of the transfer belts have suction holes positioned along each of the transfer belts. A vacuum source within each belt draws air inwardly into the suction holes which holds caps against the belt. The belts move in unison to carry the bottle caps to the second ends where a cap stripper detaches each cap from the transfer belts.

12 Claims, 15 Drawing Sheets

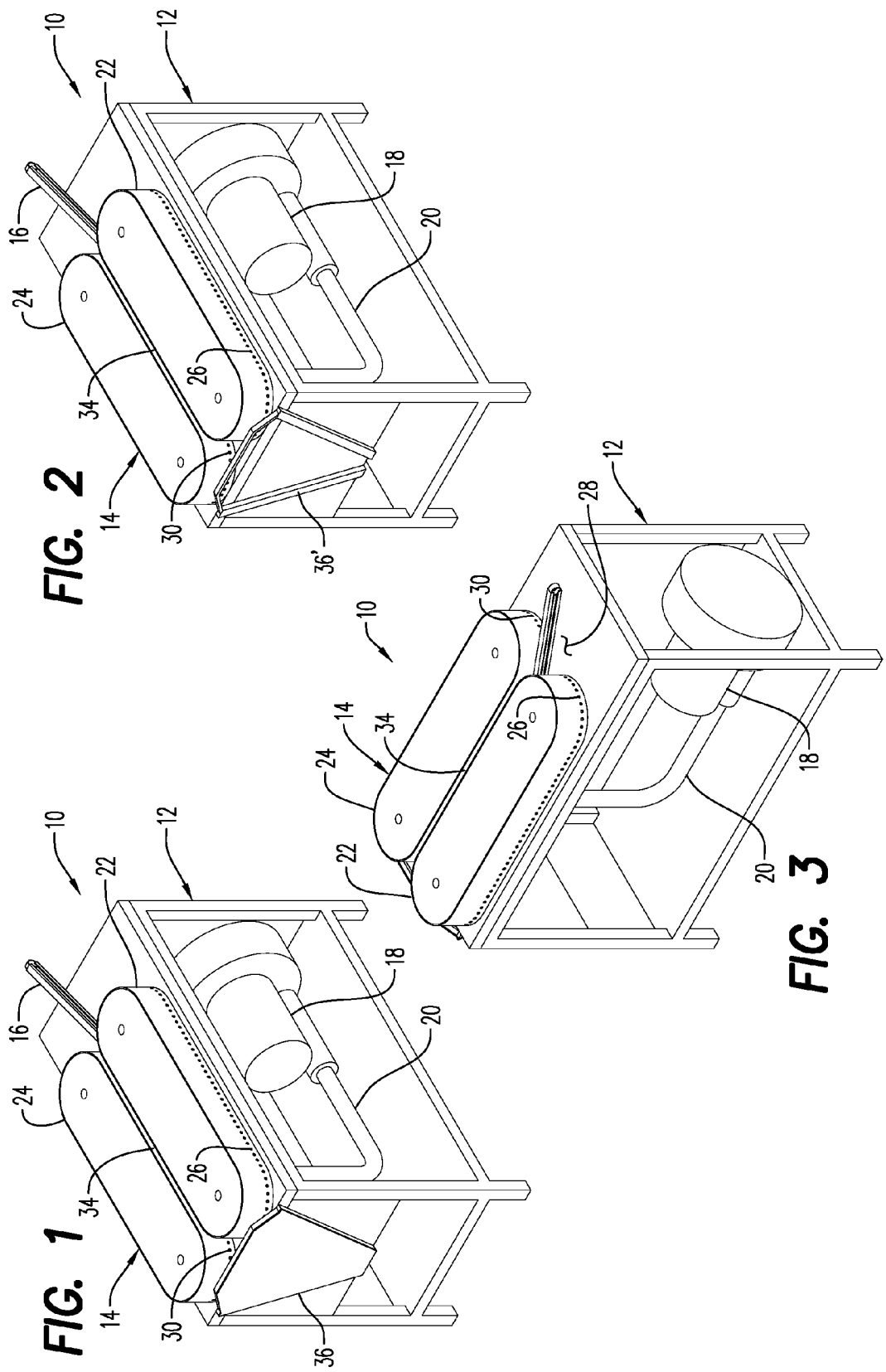

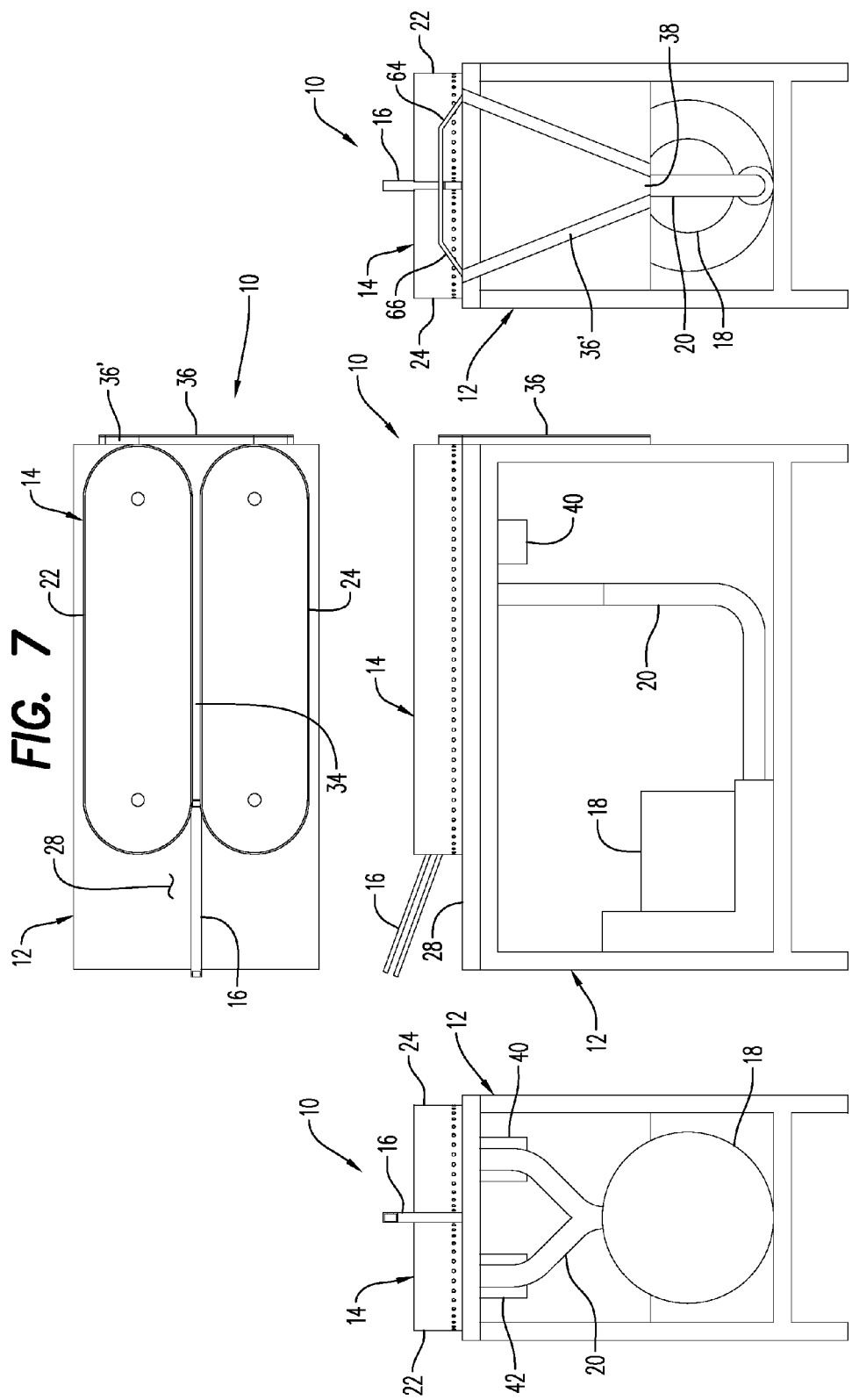

BOTTLE CAP ORIENTING APPARATUS

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to bottling apparatus, and more particularly to an apparatus for feeding bottle caps into the bottling apparatus in which the caps incoming are unoriented with respect to the open side of the caps and within which the caps are all uniformly oriented before being fed into the bottling apparatus.

2. Description of Related Art

In bottling operations, after each bottle is filled with an appropriate amount of contents such as a beverage, caps are then screwed or clenched tightly onto the open beverage containers thus sealing them ready for further packaging and shipment. However, a prior step with regard to the caps is the proper orientation so that the open sides of the caps are all facing in an appropriate direction for installation onto the open bottle mouths.

Where the caps are magnetic, U.S. Pat. No. 4,081,069 to Ono teaches a feeding apparatus for magnetic caps in which the feeding apparatus includes a magnetic first conveyor belt which attracts and transfers the magnetic caps from a hopper to a second conveyor belt which separates wrongly positioned caps for conveyance into the bottling apparatus. Another feeder for bottling cappers is disclosed in U.S. Pat. No. 4,735,343 to Herzog wherein the conveyor housing may be angularly adjusted to cause bottle caps improperly oriented to fall by gravity to the bottom of the conveyor. This aspect of the Herzog teaching depends upon the offset center of gravity wherein the closed side of the cap being heavier than the open side, causes the improperly oriented caps to fall from the conveyor.

Another apparatus for orienting lids is taught by Bessels in U.S. Pat. No. 5,680,922 which includes first and second conveyor belts positioned in overlapping fashion and, by opposing movement of these belts, ensures that only properly oriented caps are attached to the second belt for conveyance into the bottling apparatus. Eitzinger in U.S. Pat. No. 4,863,007 also teaches an orienter apparatus for cup-shaped objects utilizing two rotating pin sorters positioned above and below the path of the unoriented caps, each of the pin sorters entrapping properly oriented caps for subsequent release for conveyance into a bottling apparatus.

An adjustable bottle gripper belt taught by Herzog in U.S. Pat. No. 5,007,228 discloses gripping a container or bottle while being capped filling apparatus disclosing two adjustable container grouper belt assemblies opposingly suspended on a tabletop between a conveyor. The gripper belts prevent rotation of the container while each cap is rotationally applied and tightened.

U.S. Pat. No. 4,610,345 to Spreen et al. discloses a method and apparatus for orienting and delivering dispenser cap assemblies. An apparatus for feeding closures provided with a tube to an operating unit is taught by Bianchini et al. in U.S. Pat. No. 5,031,748.

Evers, Jr. et al. teach a conveyor system for lifting and orienting bottle caps in U.S. Pat. No. 6,491,152. A conveyor apparatus used to orient objects such as closures, lids, caps, etc. is taught by Dotson et al. in U.S. Application Publication 2009/0166153.

The following U.S. patents have been identified as describing related structure and components to that of the present disclosure, although in no way rendering the present disclosure unpatentable in any sense.

U.S. Pat. No. 4,373,437 to Rodenbaugh et al.
U.S. Pat. No. 4,735,343 to Herzog
U.S. Pat. No. 4,779,714 to Madden
U.S. Pat. No. 5,050,722 to Beswick
U.S. Pat. No. 5,333,719 to Piazza
U.S. Pat. No. 5,396,979 to Wysocki
U.S. Pat. No. 5,586,637 to Aidlin et al.
U.S. Pat. No. 5,954,184 to Schmitt
U.S. Pat. No. 7,228,953 to Perreault et al.
U.S. Pat. No. 7,322,458 to McDonald et al.

The present invention teaches a simple yet virtually foolproof apparatus for orienting bottle caps of virtually any size, regardless of material content, by the use of a pair of opposed moving belts rotating in unison together wherein each of the unoriented caps are fed between the belts atop a support surface which maintains the caps in height alignment with a row of holes formed in each of the belts just above the support surface equal to about half the diameter of the caps. A vacuum source from within each of the belts draws air into the suction holes to hold the open side of each of the caps by suction against the corresponding belt over one of the suction holes. The closed side of the caps, being slightly crowned, are unable to be suction held against one of the holes, will be attracted to an open hole on the opposite or facing belt and held in that orientation until detached from the corresponding belt at the far end of the apparatus for collection into a collection chute and properly oriented.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a bottle cap orienting apparatus including a cap transfer assembly having a pair of opposed spaced apart continuous transfer belts each having curved first and second ends and upright facing straight sides opposingly spaced apart to define a gap preferably sized to be equal to or slightly greater than a height of the caps being transferred and reoriented for subsequent feeding into a bottle capping apparatus. Unoriented bottle caps are fed between the first end in edge upright orientation into the gap. Each of the transfer belts have spaced apart suction holes positioned along an edge of each of the transfer belts. A vacuum source within each belt draws air inwardly into the suction holes to hold caps against the belts, open side of each cap against the belt over one of the holes. The belts move in unison to carry the bottle caps therebetween to the second ends where a cap stripper detaches each cap from the corresponding transfer belt with the open ends of all of the caps facing in the same direction when being so detached and deposited into a collection chute.

It is therefore an object of this invention to provide a bottle cap orienting apparatus which will supply properly and consistently oriented bottle caps into a bottling apparatus.

Yet another object of this invention is to provide a bottle cap orienting apparatus which will properly orient bottle caps being fed into a bottling apparatus regardless of the type of material, whether magnetic, metal or plastic, being used to cap filled bottles in a bottling apparatus.

Still another object of this invention is to provide a bottle cap orienting apparatus which is easily adaptable to various bottle cap sizes.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

FIGS. 1 to 3 are perspective views of one embodiment of the invention.

FIG. 4 is a side elevation view of FIG. 1.

FIG. 5 is a left end elevation view of FIG. 4.

FIG. 6 is a right end elevation view of FIG. 4.

FIG. 7 is a top plan view of FIG. 4.

Figure 8:
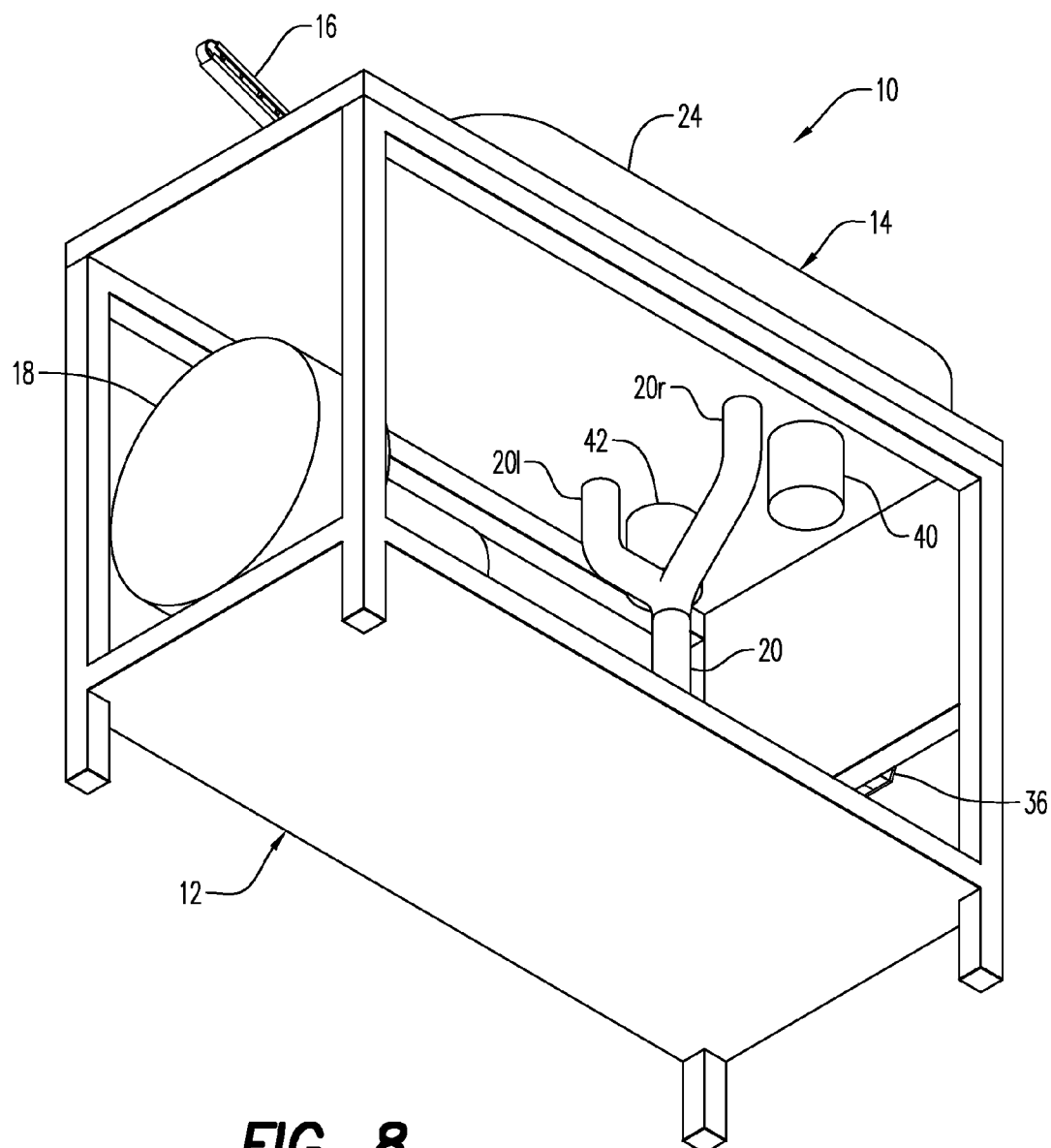
FIG. 8 is a lower perspective view of FIG. 1.

Exemplary embodiments are illustrated in reference figures of the drawings. It is intended that the embodiments and figures disclosed herein are to be considered to be illustrative rather than limiting.

LIST OF COMPONENTS

10. bottle cap orienting apparatus
12. frame
14. cap transfer assembly
16. cap feeder
18. motor/vacuum
20. vacuum conduit
20*r*. right-hand conduit
20*l*. left-hand conduit
22. left-hand transfer belt
24. right-hand transfer belt
26. suction hole
28. cap support surface
30. suction holes
34. belt gap
36. cap collection chute
36'. chute frame
38. cap outlet
40. right-hand belt drive
42. left-hand belt drive
44. left-hand belt sheave shaft
46. left-hand belt sheave shaft
48. right-hand belt sheave shaft
50. right hand belt sheave shaft
52. left-hand solid area
54. right-hand solid area
56. left-hand vacuum chamber
58. right-hand vacuum chamber
60. left-hand chamber extension
62. right-hand chamber extension
64. left-hand cap stripper
66. right-hand cap stripper
68. cap collection chamber
70. reversible transfer belt
72. small suction holes
74. large suction holes
76. cap retainer plate
78. retainer pin
80. adjustment slot
82. cap transfer assembly
84. right-hand transfer belt
86. left-hand transfer belt
88. left-hand belt sheave
90. right-hand belt sheave
92. left-hand belt sheave shaft
94. right-hand belt sheave shaft
96. belt tensioner wheel
98. tensioner adjust arm
100. tensioner roller
102. belt take up
104. left-hand belt centering bead
106. right-hand belt centering bead
108. suction hole
110. suction hole
112. left-hand top plate
114. left-hand bottom plate
116. left-hand intermediate plate
118. left-hand vacuum chamber
120. right-hand top plate
122. right-hand bottom plate
124. right-hand intermediate plate
126. right-hand vacuum chamber
130. cap transfer assembly
132. gap adjust
134. threaded shaft adjustment
136. fixed block 140. cap collection bin
142. bin frame
144. transparent cover plate
146. bin intermediate plate
148. cap discharge chute
150. cap outlet
152. air inlet tube
154. air inlet
156. air chamber
158. air ports
160. air flow plenum

DETAILED DESCRIPTION OF THE INVENTION

Referring now to the drawings, and firstly to FIGS. 1 to 8, one embodiment of the invention is there shown generally at numeral 10 and includes a metal frame 12 having an upper cap support surface 28 atop which is affixed a cap transfer assembly 14. A cap feeder 16, which is preferred, is oriented and attached to the cap support surface 28 in general alignment with a belt gap 34 formed between the left-hand and right-hand transfer belts 22 and 24 of the cap transfer assembly 14. A cap collection chute 36, generally preferred, is attached in upright orientation second or at the discharge end of the cap transfer assembly 14.

Attached to the frame 12 beneath the cap support surface 28 is a motor/vacuum 18 which suctions air and produces a vacuum within vacuum conduit 20 and right-hand and left-hand conduits 20r and 20l. Right-hand and left-hand belt drives 40 and 42 are attached to the bottom surface of the cap support surface 28 in belt-driving engagement within the second ends of the transfer belts 22 and 24 as best seen in FIG. 8.

Figure 10:
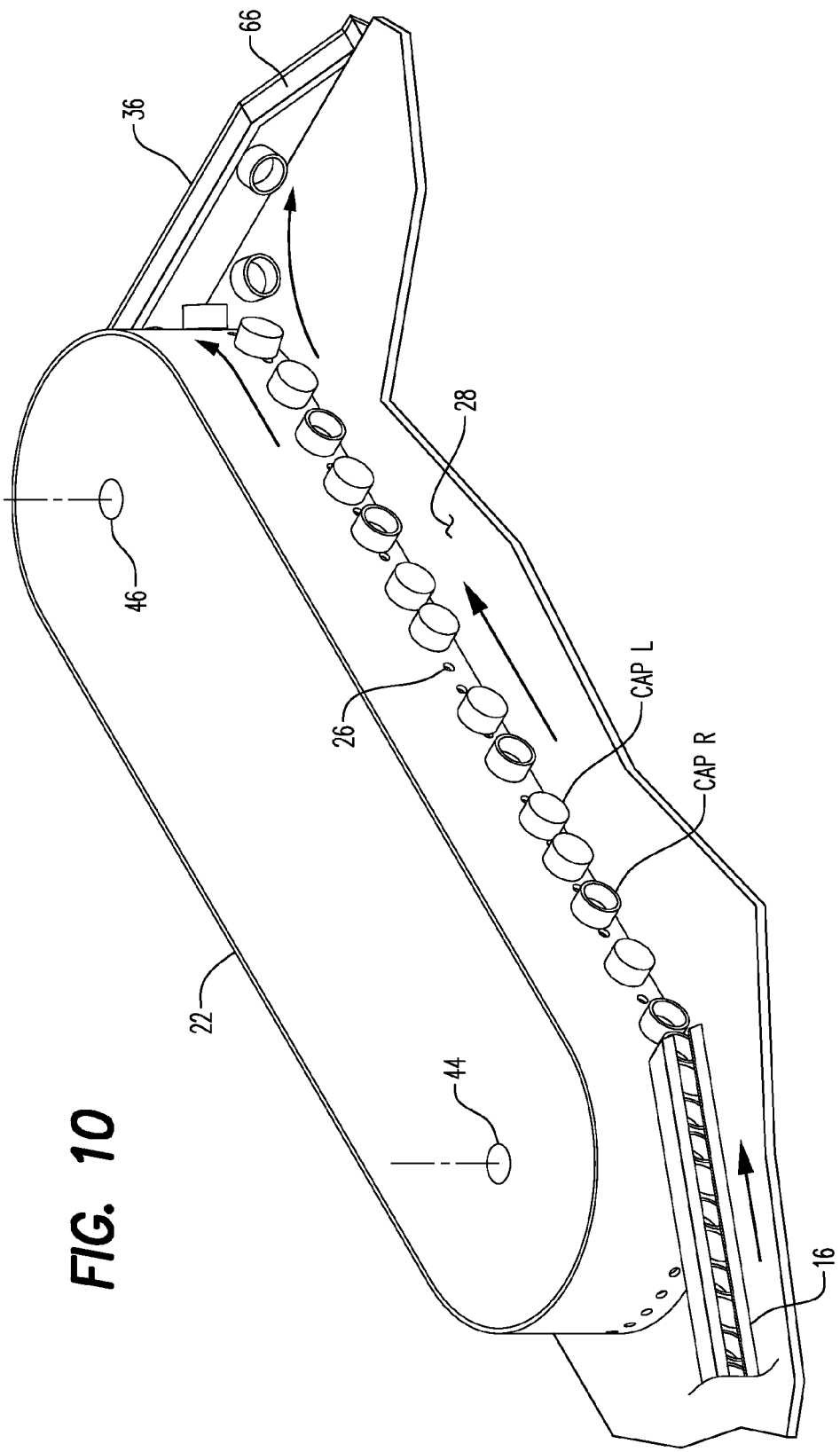
FIG. 10 is an enlarged broken perspective view of FIG. 1 showing one of the transfer belts carrying bottle caps therealong.
Figure 11:
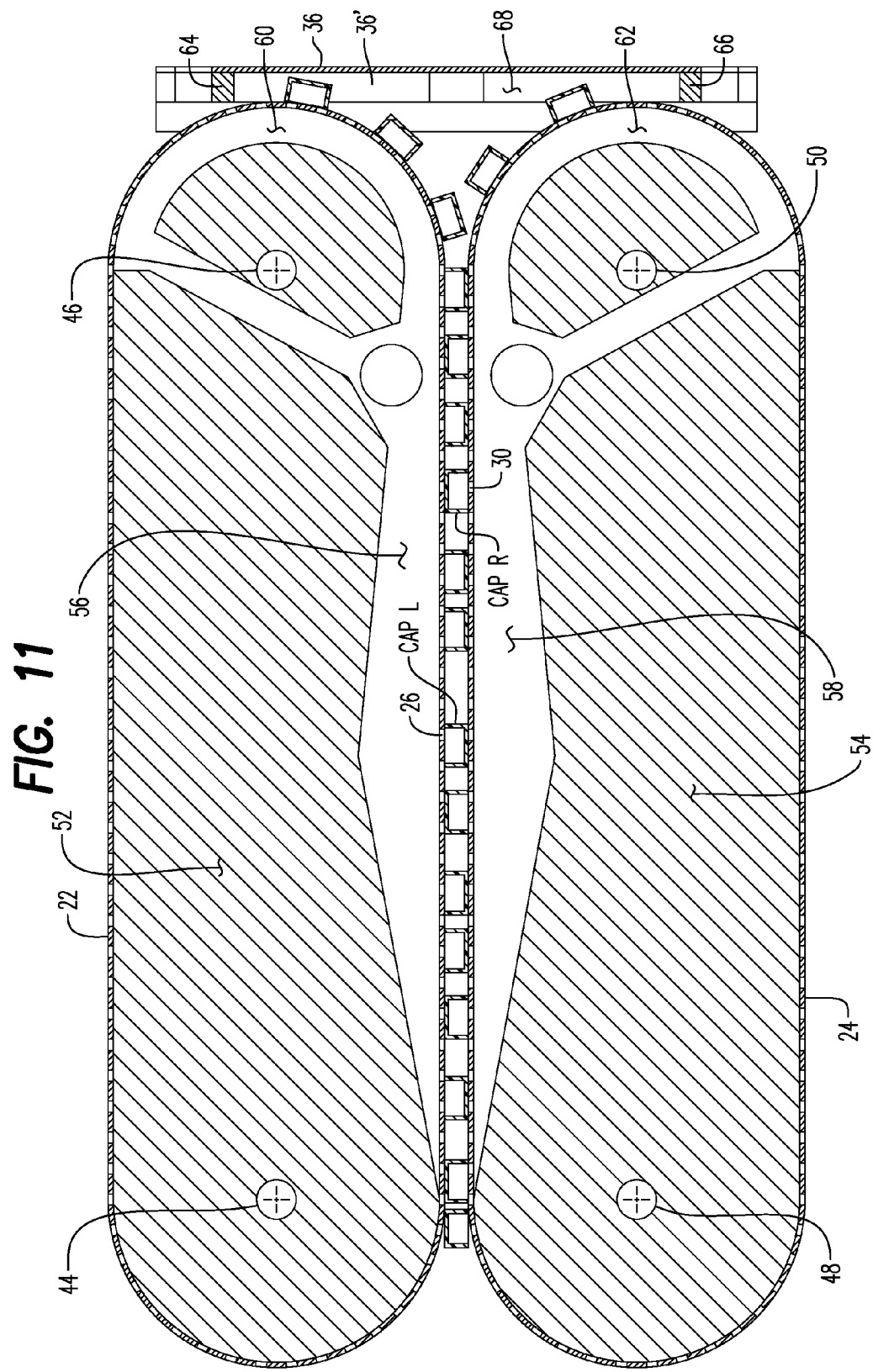
FIG. 11 is a top plan section view in the direction of arrows 11-11 in FIG. 9.
Figure 12:
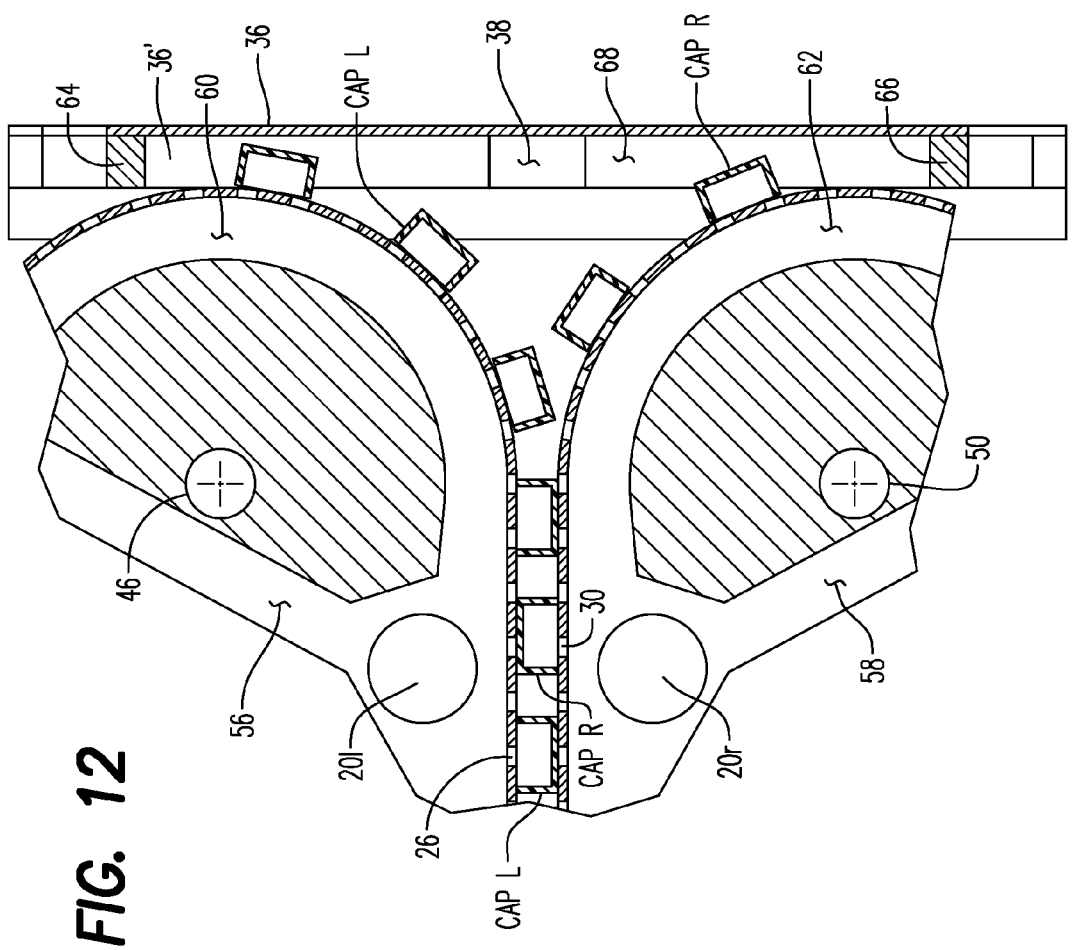
FIG. 12 is an enlarged view of the cap discharge end of FIG. 11.

As best seen additionally in FIGS. 11 and 12, each of the transfer belts 22 and 24 are formed of flexible material and include a row of suction holes 26 formed completely therearound extending along the lower edge of each of the belts 22 and 24. These transfer belts 22 and 24 are drivingly rotated in the direction of the arrows best seen in FIGS. 9 and 10 about upright sheave shafts 44/46 and 48/50, the drive mechanism being described herebelow.

Each of the conduits 20l and 20r are in vacuum communication with left-hand and right-hand vacuum chambers 56 and 58 within the perimeter of the racetrack-shaped transfer belts 22 and 24, respectively. These vacuum chambers 56 and 58 are at a height above the cap support surface 28 generally equal to about half of the diameter of the bottle caps being oriented so as to be in vertical alignment with the row of suction holes 26 and 30 of the respective transfer belts 22 and 24. The vacuum chambers 56 and 58 extend around the semi-circular curved second or discharge ends of the transfer belts 22 and 24 to chamber extensions 60 and 62, respectively. By this arrangement, each of the metallic or non-metallic bottle caps will be suction adhered over one or two of the aligned suction holes 26 or 30 with the open side of each of the caps facing toward and covering the corresponding suction holes. Conversely, the slightly crowned closed end of each of the caps, when positioned over one or more of the suction holes 26 or 30 will not be vacuum adhered against the transfer belt in this manner as vacuum leakage around the crowned closed end of the cap will fail to maintain sufficient suction adhesive to hold the cap, crowned side there against.

Figure 9:
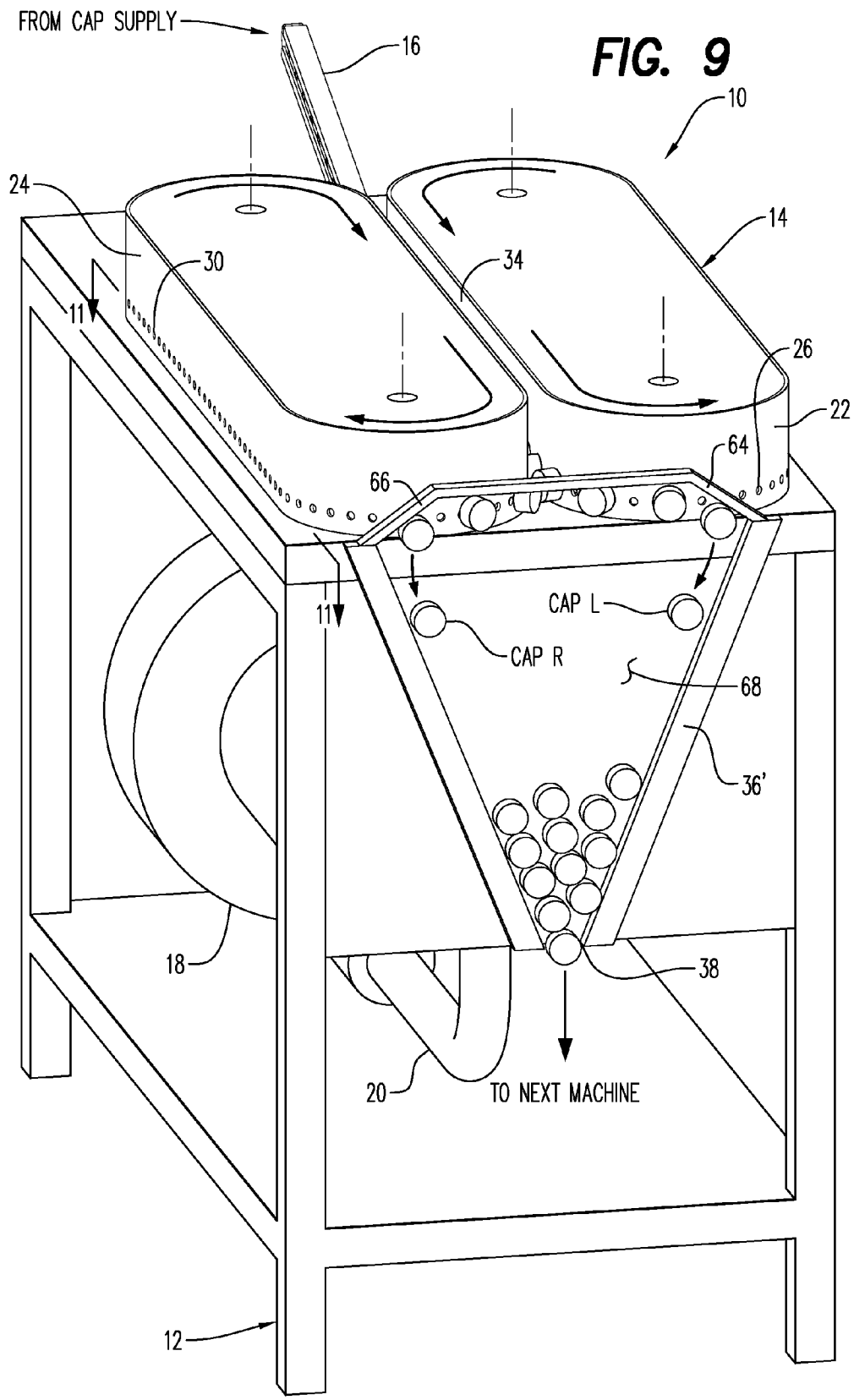
FIG. 9 is another perspective view of FIG. 2 in operation with the cap collection chute cover removed for clarity.

As best seen in FIGS. 9 and 10, the caps L and R are fed into the cap feeder 16 on edge and moved downwardly by gravity in the direction of the arrow. The discharge end of the cap feeder 16 is positioned at the beginning of the gap 34 defined between the upright facing straight sides of the transfer belts 22 and 24. The size of the gap 34 is established to be equal to or slightly larger than the height of the bottle caps such that, when the open side of each of the caps are suction attached over one or more of the corresponding suction holes 30 and 26, the caps will move along in the direction of the arrow supported atop the cap support surface 28. Regardless of the orientation of the caps as they are fed downwardly along the cap feeder 16, the open side of each of the caps CR and CL will be suction adhered to one of the transfer belts 22 or 24 with the open side of the cap facing thereagainst.

As best seen in FIGS. 10, 11 and 12, the caps CL and CR are held over one or more of the corresponding suction hole(s) 26 and 30 through about half of the length of the semi-circular discharge end of the corresponding transfer belt 22 or 24. At that point, as also seen in FIG. 9, the caps CL and CR strike or abut against the corresponding left-hand or right-hand cap stripper 64 or 66 and are released from suction engagement over the corresponding suction hole(s) 26 or 30. The caps CL and CR then fall by gravity downward into a cap collection chamber 68 of the cap collection chute 36 shown in FIG. 9 with the chute cover removed at 36' for clarity. The caps CL and CR then accumulate for discharge from the cap outlet 38 of the cap collection chute 36 to the next stage of the bottling apparatus (not shown).

Figure 13:
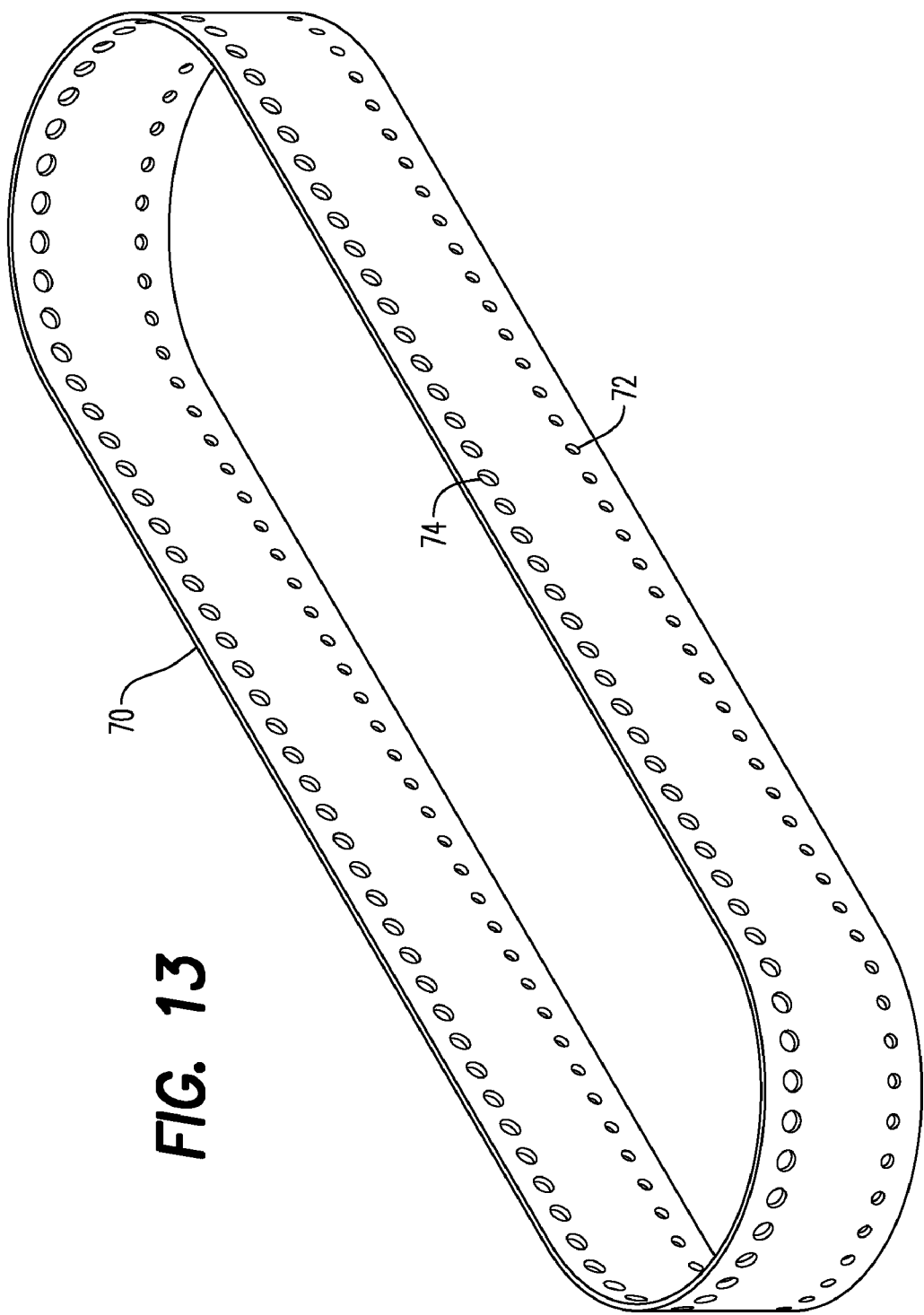
FIG. 13 is a simplified perspective view of a reversible transfer belt adapted for use with multiple bottle cap sizes.

Referring now to FIG. 13, an alternate embodiment of the transfer belt is there shown generally at numeral 70 and is formed of thin, flexible material generally in the shape of a racetrack as previously described. However, in this transfer belt embodiment 70, two separate rows of suction holes 72 and 74 are there provided. Each of these rows of suction holes 72 and 74 are preferably evenly spaced apart one to another and extend around the corresponding margin of the transfer belt 70 and at a distance from the corresponding edge or margin of the transfer belt 70 a distance generally equal to half of the diameter of the bottle cap being oriented for conveyance to the bottle capping apparatus (not shown). However, the larger suction holes 74 will typically be larger in diameter to accommodate and facilitate suction attachment of larger, heavier caps and will also be correspondingly spaced slightly further from the upper edge of the transfer belt 70 so as to be positioned at the approximately above the cap support surface 28 about half of the diameter of the bottle cap being transferred.

Figure 14:
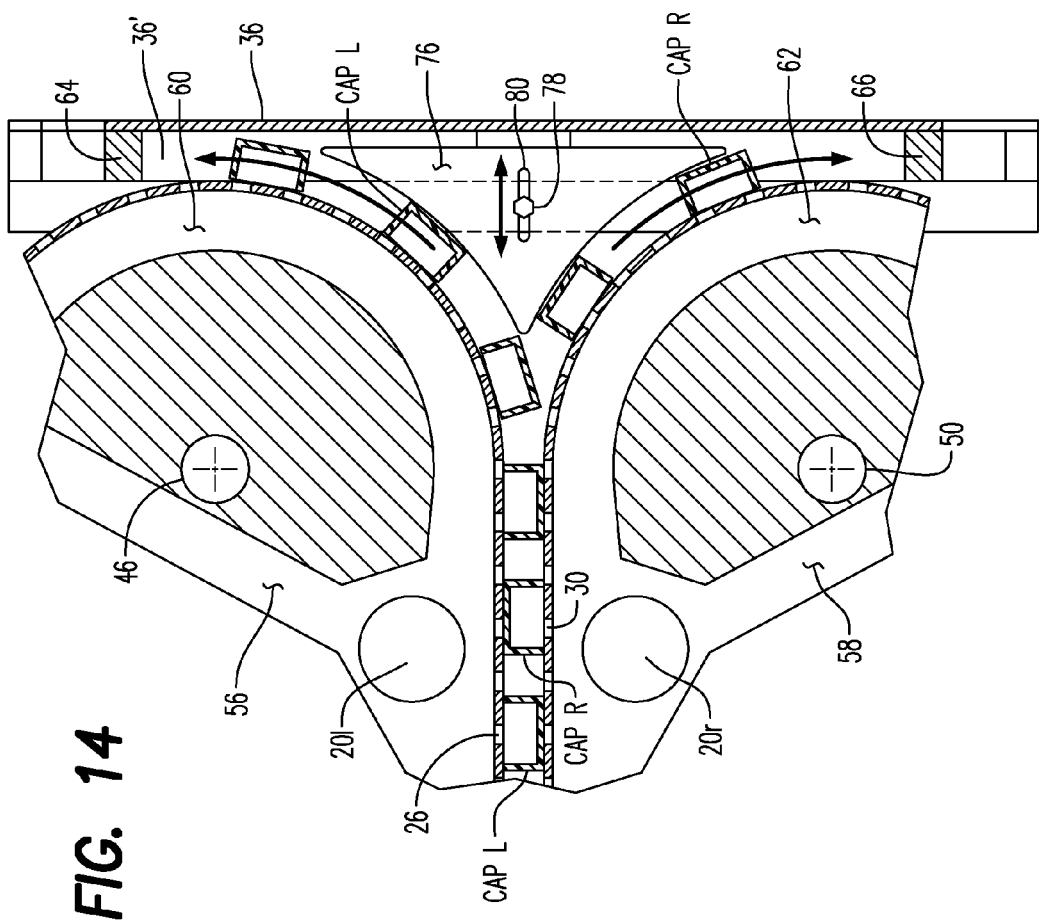
FIG. 14 is a view of FIG. 12 with the addition of a preferred cap retainer plate.

Referring now to FIG. 14, a preferred cap retainer plate 76 is there added so as to assist in maintaining each of the caps CL and CR in the suction-adhered position against the curved second end of the corresponding transfer belt 22 and 24 as the caps CL and CR are moved around the semi-circular radius of the second or discharge end of the transfer belts 22 and 24. The cap retainer plate 76 is adjustably movable in the direction of the arrow on retainer pin 78 within adjustment slot 80 so as to avoid excess friction contact against the closed end of the caps as they move in arcuate fashion to be released against cap strippers 64 and 66 as previously described. Again, note that all of the caps L and R are oriented in the same direction as they are stripped away from the transfer belts 22 and 24.

Figure 15:
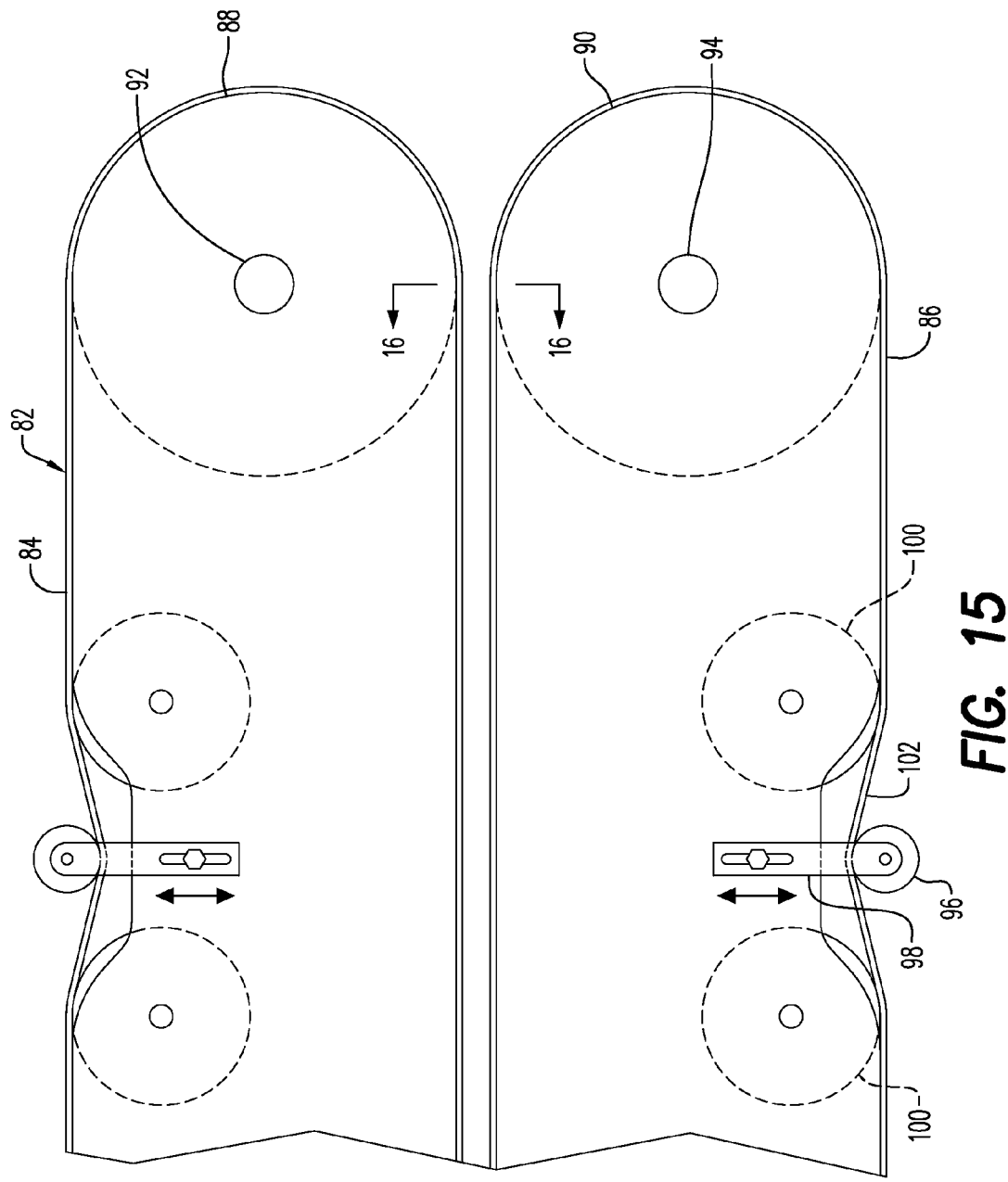
FIG. 15 is a top plan view of an alternate and preferred embodiment of a portion of the apparatus and including a transfer belt tensioner arrangement.

Referring now to FIG. 15, the left-hand and right-hand transfer belts 84 and 86 rotate about, and are driven by, left-hand and right-hand belt sheaves 88 and 90 on left-hand belt shaft 92 and right-hand belt shaft 94, respectively. These transfer belts 84 and 86 will typically either have or develop excess length due to manufacturing tolerances and/or stretch which is dealt with by a belt tensioner wheel 96 pin connected to a tensioner adjust arm 98 connected within the corresponding transfer belts 84 and 86. The belt tensioner wheel 96 acts between tensioner rollers 100 and, by adjustment of the positioning of the tensioner adjust arm 98, proper transfer belt tensioning against the belt sheaves 88 and 90 is maintained.

Figure 16:
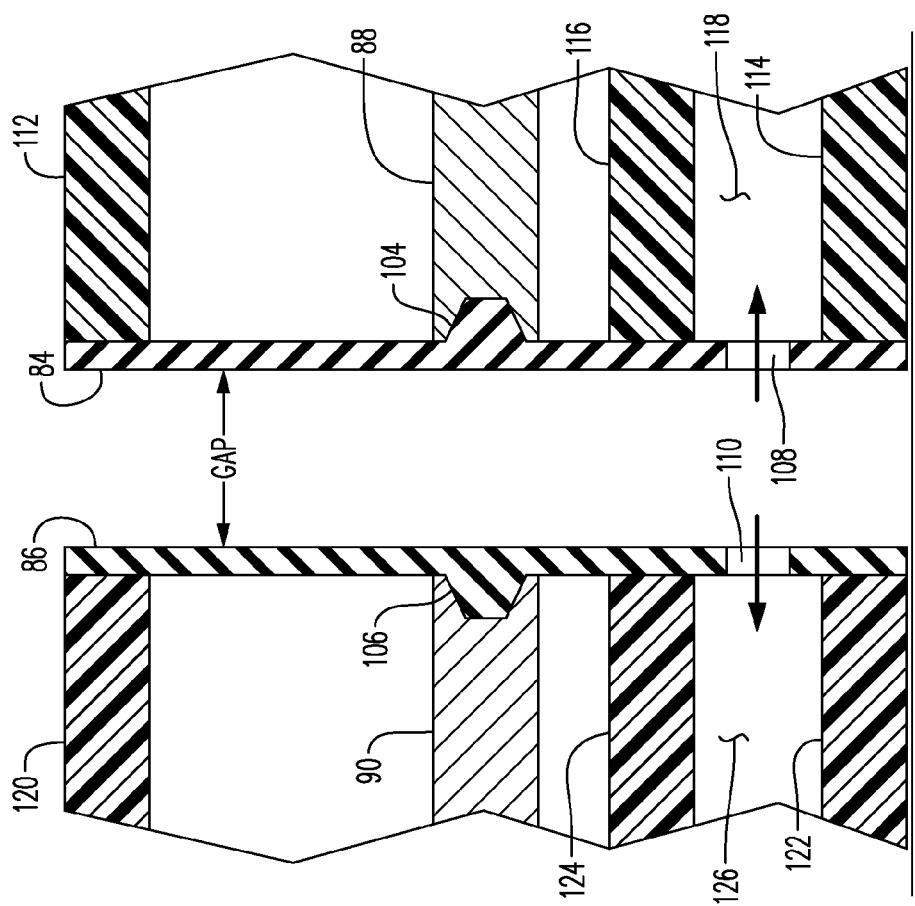
FIG. 16 is a section view in the direction of arrows 16-16 in FIG. 15.

As seen in FIG. 16, each of the transfer belts 84 and 86 include inner facing centering beads 104 and 106, respectively. These centering beads 104 and 106 mate within a correspondingly formed edge of each of the belt sheaves 88 and 90 to enhance deriving engagement therebetween. This sheave centering bead arrangement also prevents upward or downward movement of the transfer belts 84 and 86 while the apparatus 10 is in operation. The left-hand and right-hand vacuum chambers 118 and 126 are formed between bottom plates 114 and 122 and intermediate plates 116 and 124 such that the row of suction holes 108 and 110 are in alignment therewith. This arrangement insures that air will be suctioned inwardly in the direction of the arrows through the suction holes 108 and 110 for the purpose above-described, i.e., suction-holding an open end of a bottle cap thereagainst. Top plates 112 and 120 serve as an additional transfer belt guides and supports and enclose the remainder of the interior of each of the transfer belts 84 and 86, the lower margins of the transfer belts being positioned in close proximity above the cap support surface 28 as previously described.

Figure 17:
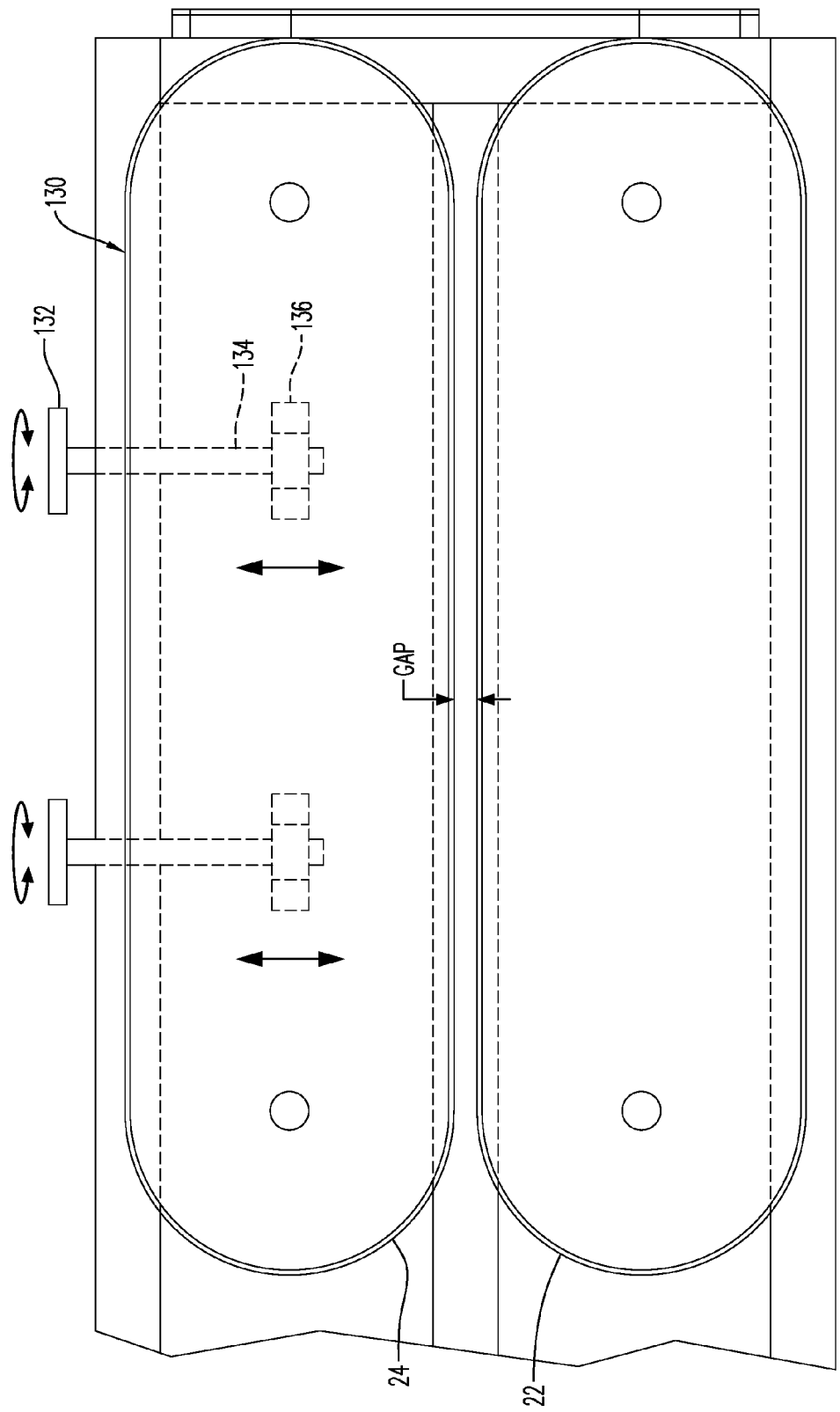
FIG. 17 is a top plan view of still another embodiment of the invention showing a bottle cap gap adjustment arrangement for maintaining a proper gap or spacing between the facing surfaces of the transfer belts.

Referring now to FIG. 17, the cap transfer assembly 130 is preferably provided with a pair of spaced apart gap adjusts 132 which establish and control the size of the gap between the transfer belts 22 and 24. Again, the gap is preferably sized to generally equal or be slightly larger than the overall height of the bottle cap being transferred and oriented. Adjustment of the size of the gap is made by rotating the gap adjust 132 and threaded shaft adjustment 134 in the direction of the arrows within fixed block 136.

Figure 18:
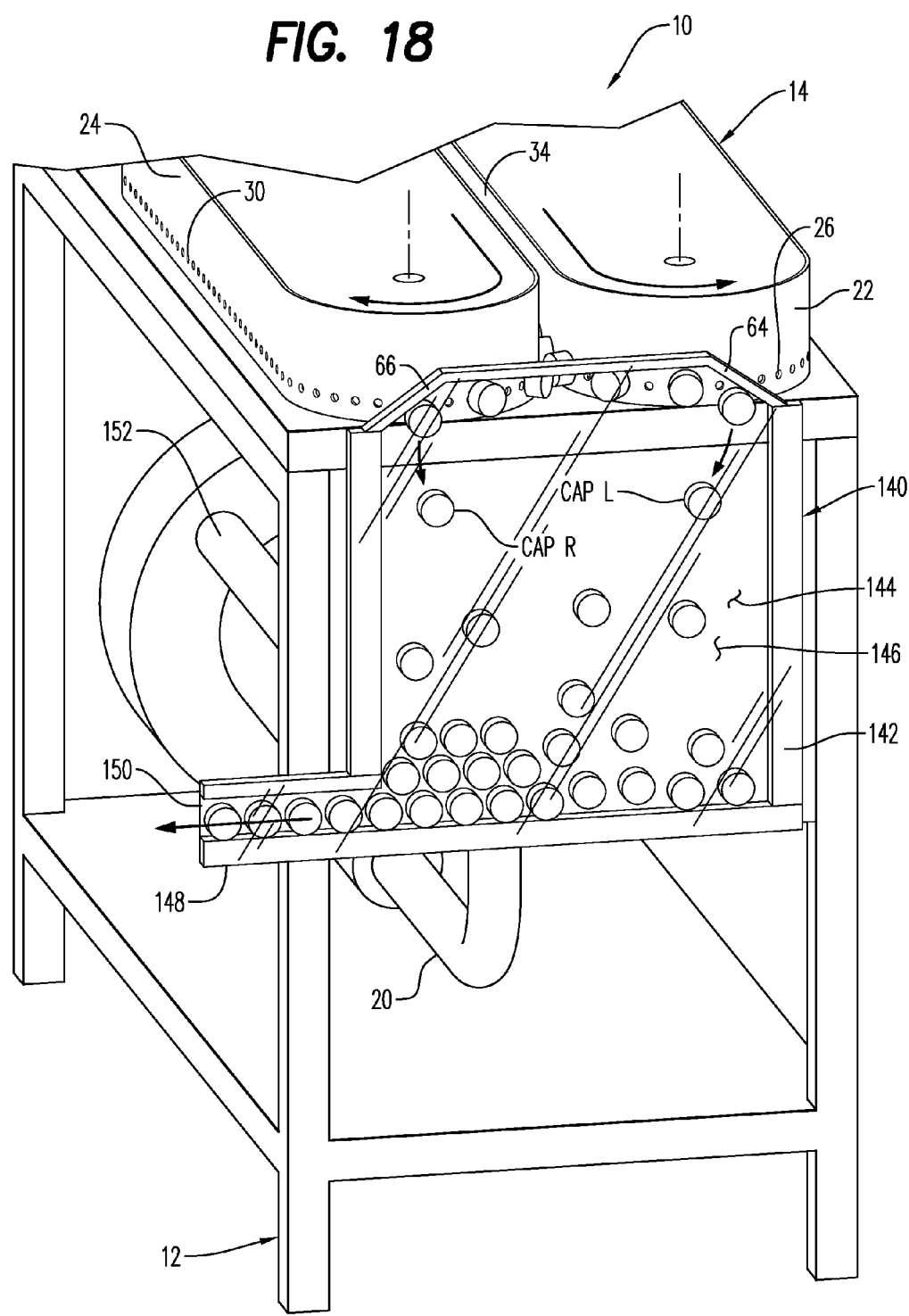
FIG. 18 is a view similar to FIG. 9 showing an alternate and preferred cap collection bin.
Figure 19:
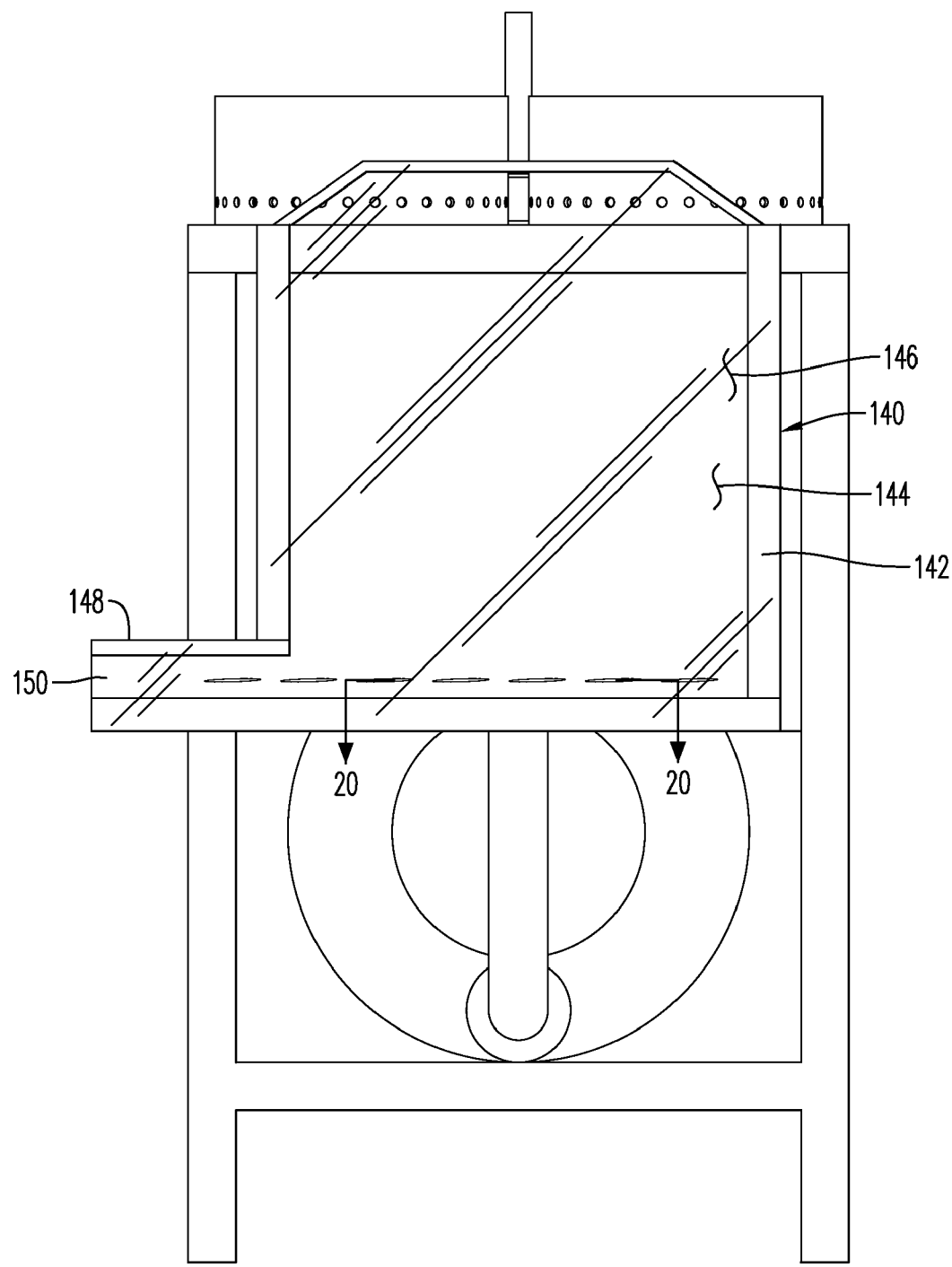
FIG. 19 is an end elevation view of FIG. 18.
Figure 20:
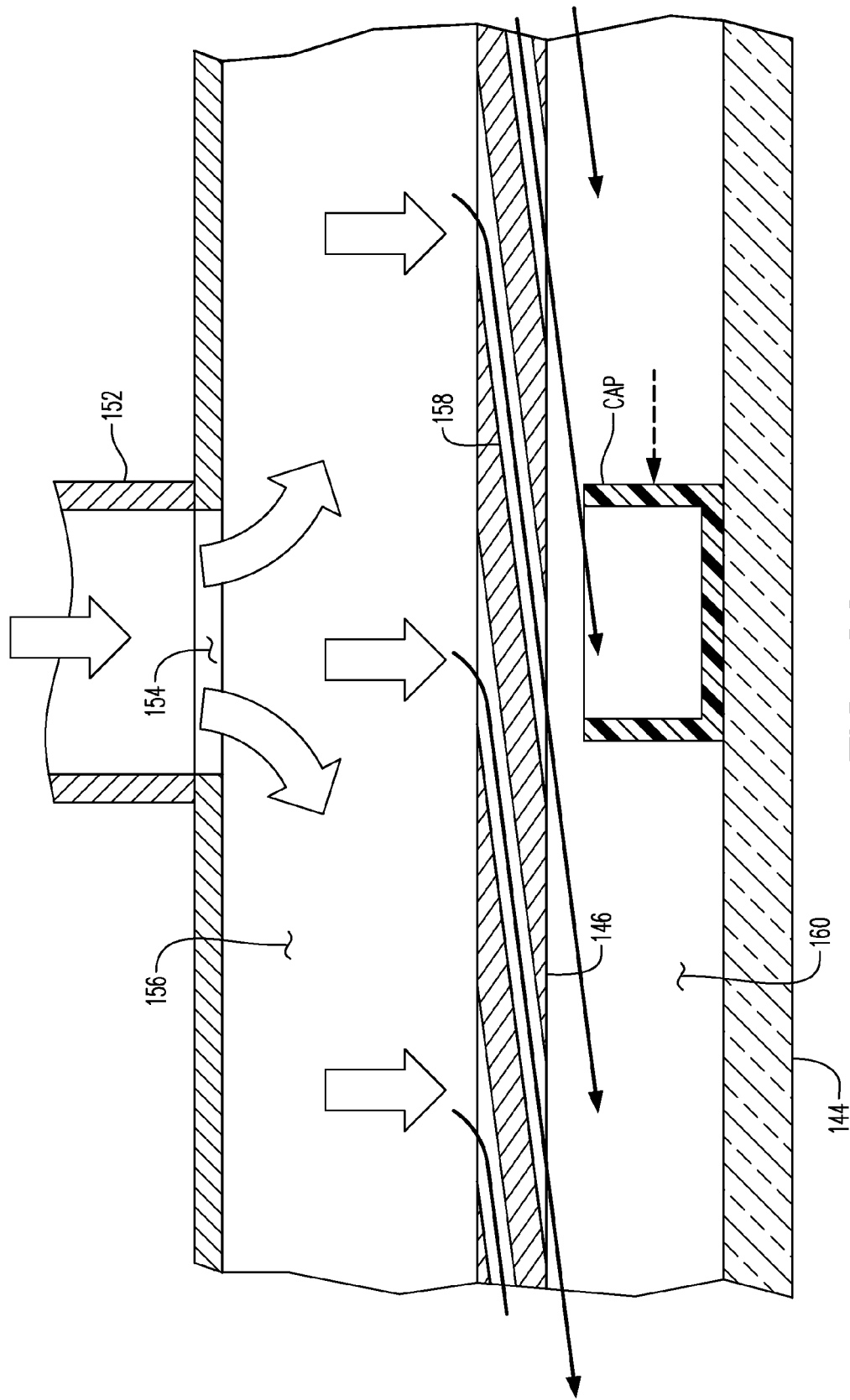
FIG. 20 is a section view in the direction of arrows 20-20 in FIG. 19.

Referring lastly to FIGS. 18, 19 and 20, an alternate and preferred embodiment of the cap collection bin is there shown generally at numeral 140. In this collection bin 140, a rectangular frame 142 is provided which supports an inner upright bin intermediate plate 146 in spaced apart relationship with a transparent outer cover plate 144. The caps CR&L fall downwardly by gravity after being stripped from the curved second or discharge ends of each of the transfer belts 22 and 24 as previously described. The caps CR&L fall downwardly against the lower portion of the bin frame 142 for discharge from a cap outlet 150 of cap discharge chute 148. To assist in and expedite cap discharge in this manner, pressurized air produced by the motor/vacuum 18 previously described is fed into an air inlet tube 152 and into an air chamber 156 through air inlet 154 in the direction of the arrows in FIG. 20. This pressurized air is then forced through air ports 158 which are angularly oriented in spaced relationship through the intermediate plate 146. These elongated sloping air ports 158 force air in the direction of the arrows and against each of the caps in the direction of the broken line arrow to accelerate and force the caps to more quickly discharge from the cap discharge chute 148.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A bottle cap orienting apparatus comprising:
   a cap transfer assembly including a pair of horizontally extending spaced apart continuous transfer belts each having spaced belt sheaves positioned in driving communication within curved first and second ends of said transfer belt, said transfer belts having upright facing straight sides opposingly spaced apart to define a gap sized to be equal to or greater than a height of the bottle caps being fed in edge upright orientation into the gap;
   each of the transfer belts of said pair having a row of spaced apart suction holes extending along and above a lower edge of said transfer belt and a cap support surface of said transfer assembly;
   a vacuum source in fluid communication with an interior of said transfer belts for drawing air inwardly into said suction holes;
   said transfer belts moving the bottle caps positioned edgewise atop said cap support surface and between said straight sides from the first ends to said second ends, each open side of each cap being held by the vacuum suction against one of said suction holes;
   a cap stripper positioned at each of said second ends to detach each cap from the corresponding said transfer belt to which the cap is suction attached as it exits from said gap, all of the caps being oriented with the open ends of the caps facing in the same direction when being so detached.

2. A bottle cap orienting apparatus as set forth in claim 1, wherein:
   said transfer belts also include a second row of spaced apart larger suction holes being larger in diameter than said suction holes, said second row being positioned substantially equi-distance below an upper edge of said transfer belts wherein each of said transfer belts are reversibly positionable on said belt sheaves when said apparatus is used for orienting larger cap sizes.

3. A bottle cap orienting apparatus as set forth in claim 1, further comprising:
   a belt tensioner for adjustably eliminating looseness in each of said transfer belts.

4. A bottle cap orienting apparatus as set forth in claim 1, further comprising:
   a gap adjuster for moving one said transfer belt relative to the other of said transfer belts to maintain a desired gap size relative to the height of the caps.

5. A bottle cap orienting apparatus comprising:
   a cap transfer assembly having a cap support surface and including a pair of horizontally extending spaced apart continuous driven transfer belts each having curved semi-circular first and second ends and an upright inward facing straight side;
   said straight sides opposingly spaced apart to define a gap therebetween sized to be equal to or greater than a height of bottle caps being fed into said gap from a cap feeder;
   each of the transfer belts of said pair having a row of spaced apart suction holes positioned above and extending along a lower edge of said transfer belt and said cap support surface;
   a vacuum source for drawing air inwardly into said suction holes;
   said transfer belts carrying the bottle caps positioned between said straight sides from the first ends to said second ends, only each open side of each cap being held by suction against one of said suction holes by said vacuum source;
   a cap stripper positioned at each central point of said second ends to detach each cap from the corresponding said transfer belt to which the cap is suction attached after exiting said gap, all caps being oriented with the open ends of the caps facing inwardly of said second end in the same direction when being so detached.

6. A bottle cap orienting apparatus as set forth in claim 5, wherein:

said transfer belts also include a second row of spaced apart larger suction holes being larger in diameter than said suction holes, said second row being positioned substantially equi-distance below an upper edge of said transfer belts wherein each of said transfer belts are reversibly positionable on said belt sheaves when said apparatus is used for orienting larger cap sizes.

7. A bottle cap orienting apparatus as set forth in claim 5, further comprising:

a belt tensioner for adjustably eliminating looseness in each of said transfer belts.

8. A bottle cap orienting apparatus as set forth in claim 5, further comprising:

a gap adjuster for moving one said transfer belt relative to the other of said transfer belts to maintain a desired gap size relative to the height of the caps.

9. A bottle cap orienting apparatus comprising:

a cap transfer assembly including a pair of horizontally extending spaced apart continuous transfer belts each having a belt sheave in driving communication within each curved first and second ends of said transfer belt, said transfer belts having upright facing straight sides opposingly spaced apart to define a gap;

an elongated cap feeder positioned centrally between said first ends for conveying unoriented bottle caps into the gap, the gap being sized to be equal to or greater than a height of the bottle caps;

each of the transfer belts of said pair having a plurality of spaced apart suction holes positioned above a lower edge of said transfer belt and a cap support surface;

a vacuum source from within each of said transfer belts for drawing air inwardly into said suction holes;

said transfer belts being counter-rotated in unison by a drive motor to move the bottle caps positioned between said straight sides from the first ends to said second ends, each open side of each cap being held against one of said suction holes by said vacuum source;

a cap stripper positioned at each central point of said second ends to detach each cap from the corresponding said transfer belt to which the cap is suction attached exiting said gap, all caps being oriented with the open ends of the caps facing in the same direction when being so detached;

a cap collection bin for gathering and transferring the oriented caps detached from said second ends to a bottle capping apparatus.

10. A bottle cap orienting apparatus as set forth in claim 9, wherein:

said transfer belts also include a second row of spaced apart larger suction holes being larger in diameter than said suction holes, said second row being positioned substantially equi-distance below an upper edge of said transfer belts wherein each of said transfer belts are reversibly positionable on said belt sheaves when said apparatus is used for orienting larger cap sizes.

11. A bottle cap orienting apparatus as set forth in claim 9, further comprising:

a belt tensioner for adjustably eliminating looseness in each of said transfer belts.

12. A bottle cap orienting apparatus as set forth in claim 9, further comprising:

a gap adjuster for moving one said transfer belt relative to the other of said transfer belts to maintain a desired gap size relative to the height of the caps.

\* \* \* \* \*